3,804,819
RECOVERY OF FATTY ACIDS FROM TALL OIL HEADS

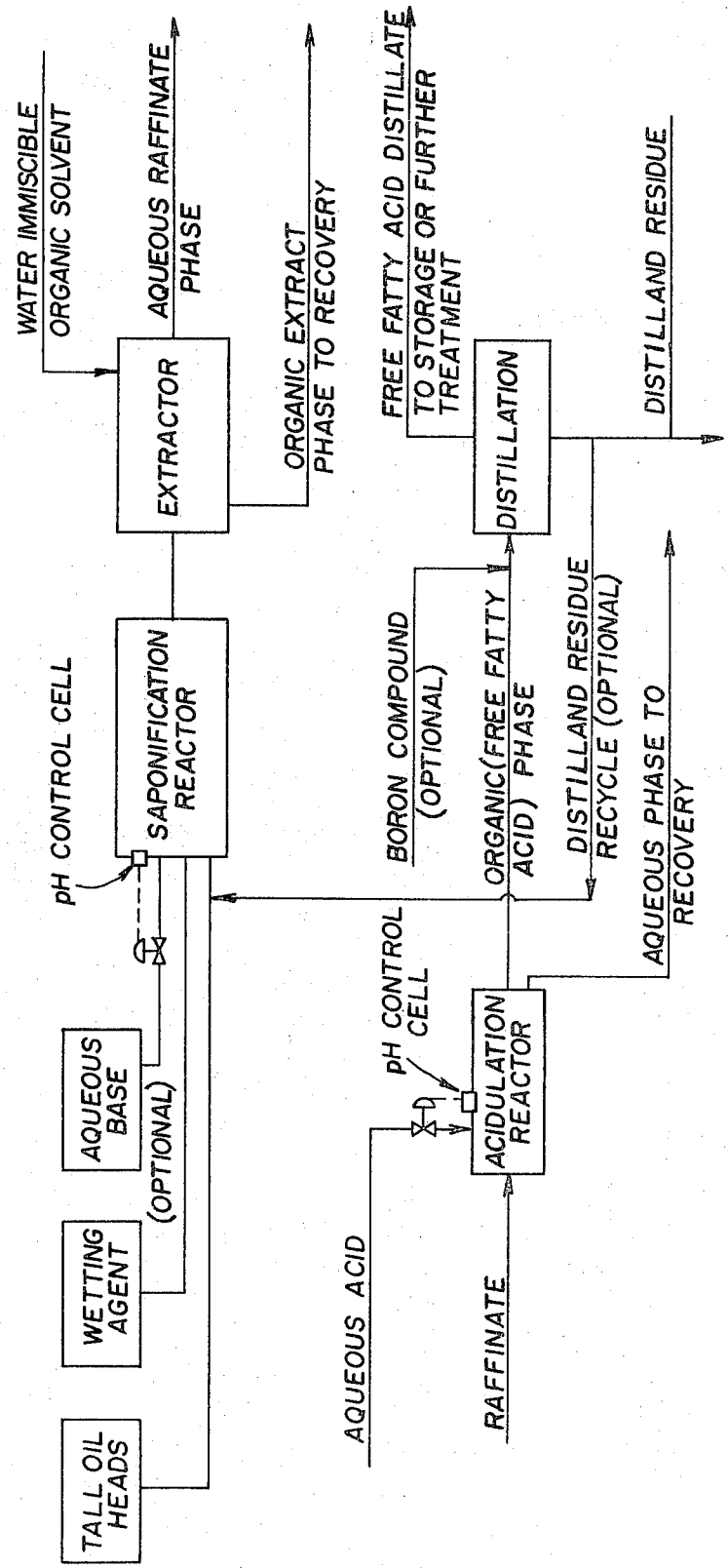

Henry R. Wengrow, Wilmer B. Stoufer, Charles W. Morris, and Dwight E. Leavens, Jacksonville, and Gerald S. Watkins, Apalachicola, Fla., assignors to SCM Corporation, Cleveland, Ohio
Filed May 3, 1972, Ser. No. 249,868
Int. Cl. C09f 1/00
U.S. Cl. 260—97.6        12 Claims

ABSTRACT OF THE DISCLOSURE

Disclosed is a method for recovering higher fatty acids from tall oil by fractionally distilling the tall oil to isolate the distillate fraction known as tall oil heads, saponifying fatty acids in the tall oil heads, solvent extracting unsaponified materials from the tall oil heads soap, acidulating the extracted tall oil heads soap to reconstitute the free fatty acid and stripping the free fatty acids with or without the presence of a boron compound, such as boric acid, to produce the specific fatty acids desired. In a preferred practice, the saponification reaction is carried out at a pH of 7 to 8.5 for improved color in the distilled fatty acid fractions. Bleaching of the fatty acids with activated carbon or clay can be employed if desired.

---

The present invention relates to purified higher fatty acids and more particularly relates to a process for recovering purified higher fatty acid from crude fatty acid fractions. The invention is advantageous in that it provides a process by which higher fatty acid of a greater purity with less color and odor are economically recovered from crude tall oil. The invention is particularly applicable to the recovery of palmitic acid from the tall oil distillate fraction known as tall oil heads.

The term "higher fatty acids" as used herein refers to $C_{12}$–$C_{22}$ aliphatic fatty acids and mixtures thereof. Higher fatty acids recovered from tall oil by conventional distillation and extraction processes generally have an undesirable brownish color and unpleasant odor, both of which often persist during and after extensive processing. Actually, the odor intensity and brown color of the higher fatty acid tend to increase during storage even after short periods of time (e.g., several days) under ambient conditions. Such odor and color in higher fatty acid detracts from its usefulness in commerce.

The present invention provides an improved process for separating higher fatty acids from highly colored and odorous non-carboxylic acid constituents normally associated with fatty acids derived from crude tall oil. Separating higher fatty acids from non-carboxylic components has been very difficult in crude tall oil obtained from the alkaline digestion of wood.

Crude tall oil is a dark-colored mixture usually comprising about 35 to 50% fatty acids and 35 to 50% rosin acid and about 5 to 15% by weight of various non-carboxylic acid constituents, such as polycyclic hydrocarbons, sterols, organic mercaptans and phenolic materials. These non-carboxylic constituents cause crude tall oil to be highly colored with very strong unpleasant odor.

In the past, many methods have been proposed for removing the non-carboxylic or unsaponified components from crude tall oil. For instance, U.S. Pat. 2,363,925 proposes the simultaneous extraction of crude tall oil with an active polar solvent having an affinity for the resin components and hydrocarbon solvent which has preference for the free fatty acids and non-acids.

U.S. Pat. 2,499,430 discloses a method of obtaining sterols from the unsaponifiable material in tall oil by a specialized solvent extraction and crystallization technique.

U.S. Pats. 2,530,809 and 2,530,810 propose a method of recovering unsaponifiable from crude tall oil by saponifying crude tall oil and extracting the saponified crude tall oil with a solvent. The unsaponifiables are then recovered from the solvent. Patent 2,530,810 is particularly concerned with removing unsaponifiable crude tall oil distillate residues.

U.S. Pat. 2,547,208 discloses the removal of unsaponifiables and color bodies from crude tall oil soap by extraction with ketone solvents.

U.S. Pat. 2,558,543 discloses a method for separating crude tall oil into a fatty acid fraction and a second fraction comprising rosin acids and unsaponifiables by a partial saponification and extraction technique.

U.S. Pat. 2,575,013 discloses a method of removing color bodies from crude tall oil soap by an acidulation-assisted extraction process. The soap is mixed with a hydrocarbon solvent, and the soap/solvent mixture is acidified to a pH below 7. The aqueous phase contains dissolved color bodies, and the solvent phase contains purified tall oil.

U.S. Pat. 2,866,781 discloses a method of extracting unsaponifiables from crude tall oil soap by extracting the soap with an ester-type solvent. In this patent, fatty acids and rosin acids are saponified.

U.S. Pat. 3,396,182 discloses a process for recovering crude fatty acids by a specialized recrystallization technique.

U.S. Pat. 3,453,253 disclosed a method of extracting black liquor with alcohol to remove fatty acid from the black liquor prior to the isolation of crude tall oil.

None of these patents has specifically solved the problem of obtaining high purity, low odor and low color, higher fatty acids from crude tall oil either because of ineffective removal of unsaponifiables before isolation of the particular tall oil fraction containing the higher fatty acids, or the generation of additional unsaponifiable materials during processing of the tall oil fraction from which the higher fatty acids are eventually to be isolated. Thus, it is the object of the present invention to provide a process that will significantly reduce the unsaponifiable or non-carboxylic acid components and other impurities (e.g. resin acids, phenolics, etc.) in tall oil so that the separation of the higher fatty acids therefrom can be economically accomplished.

In attaining the object of this invention, one feature resides in first fractionally distilling the crude tall oil to isolate the tall oil distillate fraction known as tall oil heads. The tall oil heads are then saponified with an aqueous base to form a soap, and the unsaponified components are extracted from the soap with an immiscible solvent. The soap is then acidified to reconstitute free, higher fatty acids which can be further purified by distillation, crystallization or by bleaching with clay or activated carbon.

Tall oil heads are the lower boiling constituents obtained from fractional distillation of crude tall oil. Usually, the heads comprise about 5 to 20% by weight of crude tall oil and are primarily higher fatty acids (e.g., 20 to 30% palmitic acid; 40 to 60% oleic and linoleic acid), and 20 to 30% unsaponifiable or non-carboxylic components, such as sterols, phenolics, abietenes and other low-boiling, non-carboxylic acid components which contribute color and odor, together sometimes with small amounts of rosin acids (e.g., up to 2% by weight). Typically, tall oil heads have a Gardner-Delta Color of 10 to 18, an Acid Number of 100 to 160, a Saponification Number of 100 to 180, an Iodine Number of 100 to 150, a specific gravity of 0.91 to 0.92 at 25° C. and an open-cup flash point of 188 to 199° C. Additional background information on tall oil heads can be found in the book, Tall Oil and Its Uses, published by McGraw-Hill, Inc. (1965).

The non-carboxylics of tall oil heads are mainly hydrocarbons, such as abietenes, resulting from the thermal decarboxylation of rosin during tall oil fractionation. During the distillation process of crude tall oil, the saponifiables are separated and distributed according to their boiling range. Abietenes and other low-boiling unsaponifiables accumulate in the tall oil heads. In the past when crude tall oil was saponified and then extracted with the solvents to remove unsaponifiables and the resulting purified tall oil was subject to fractional distillation to produce tall oil heads, the resulting tall oil head would still contain unsaponifiables because the fatty acids and rosin acids are susceptible to thermal degradation during fractional distillation to yield decarboxylated products which are unsaponifiable.

Accordingly, if all the unsaponifiables were removed prior to distillation as in the prior art, then the main components of tall oil are separated by distillation, additional unsaponifiables would form and concentrate in the heads and materially detract from the quality of the higher fatty acids recovered therefrom. In fact, it has been observed that the unsaponifiables increase by some 20% to 25% during fractional distillation of crude tall oil. Thus, one of the primary distinctions between the present process and the prior art is that the solvent extraction is carried out after crude tall oil distillation rather than before.

Basically, the present process for recovering higher fatty acids from tall oil heads comprises saponifying the fatty acids in said tall oil heads with an aqueous base to form an aqueous fatty acid soap phase, extracting unsaponified material from said aqueous soap phase with the water-immiscible, non-polar organic solvent having affinity for said unsaponified material to yield an aqueous raffinate phase and an organic extract phase, separating the raffinate phase from the extract phase by centrifugation, decantation or other gravity or gravity-assisted phase separation techniques, acidulating the aqueous raffinate phase with an aqueous acid to neutralize the fatty acid soap and form an organic free fatty acid phase, separating the resulting organic free fatty acid phase from the aqueous acid phase by decantation, centrifugation or other gravity or gravity-assisted technique and stripping said organic free fatty acid phase to yield a free fatty acid distillate while leaving behind a high-boiling distillate residue. The fatty acid distillate can be used "as is" for certain applications or can be further purified by standard separation techniques, such as fractional distillation, bleaching with clays or activated carbon or solvent crystallization.

The invention is illustrated in the drawing which is a schematic process flow diagram, the major steps of which are discussed below.

Saponification

The fatty acids in the tall oil head cuts are saponified with an aqueous base to form an aqueous fatty acid soap phase. The term "base" is used in accordance with conventional definitions and refers to a compound which yields hydroxyl ions in aqueous solution. The base can be any appropriate water-soluble alkaline material which yields solutions which are relatively immiscible with the organic solvent employed and includes the alkali metal hydroxides, such as, sodium, potassium, or lithium hydroxides, and alkaline earth metal hydroxides, such as calcium, magnesium, or barium hydroxides; or ammonium hydroxide. Basic salts, such as carbonates, bicarbonates and the like can also be used. For efficiency and economy, the bases are 5% to 50% aqueous solution of sodium or potassium hydroxide.

The theoretical amount of base required to saponify the tall oil head cuts can be calculated by conventional stoichiometric methods from a determination of the Acid Number of the tall oil head cuts. The amount of base employed is usually slightly in excess of that required to fully saponify the tall oil heads so that the pH of the resulting saponification reaction mixture is above 7.

In a preferred practice of the present invention, the amount of base employed is sufficient to maintain the pH of the saponification reaction mixture between about 7 and about 8.5 to selectively saponify the higher fatty acids to minimize the saponification and carryover of color bodies in the soap and thereby improving the color of the free fatty acid product.

The chemical mechanism for the criticality of pH of saponification as determinative of the color of the fatty acid product is not presently understood, although it is suspected that it might be due to a selected saponification mechanism. Tall oil heads contain a small amount of phenolic materials which are extremely dark in color and have an unpleasant odor. These phenolic compounds are reactive with the saponifying base at a much slower reaction rate than the fatty acids are saponified. Accordingly, when the saponifying base is used in the stoichiometric proportion or a slight excess over that which is required to neutralize the fatty acids, the fatty acids are selectively saponified at the expense of the phenolic components. Because the phenolic compounds remain unsaponified, they will be solvent extracted in the subsequent solvent extraction step and selectively removed from the fatty acid materials. The free fatty acid products "sprung" by acidulation from the soap prepared at a pH of 8 is much lighter in color compared with acids sprung from a soap at higher pH (e.g., about 12). The finished fatty acid products from the soap having a pH of 8 have a Gardner-Delta Color of 2 compared with a Gardner-Delta Color of 3 to 4 for those fatty acid products from the soaps at a pH of 12. The odor was also greatly improved from the lower pH soap.

Thus, it has been found that by maintaining the pH of the saponification reaction mixture in the range of about 7 to 8.5, better color and odor result in the recovered fatty acids.

The pH of the resulting saponification reaction mixture can be calculated by stoichiometric methods, or the pH can be controlled with a conventional pH control cell where the pH of the saponification reaction mixture is monitored with a pH control cell which proportions the amount of aqueous base admitted to the saponification reactor to maintain the pH within 7 to 8.5.

Because of the efficiency of fatty acid soap as emulsifiers, there is usually employed together with the aqueous base a wetting agent to reduce or resolve emulsification. The wetting agent is miscible with the aqueous base; and in a preferred practice of the invention, the wetting agent is a lower alcohol, such as methanol, ethanol or propanol and the like. It will be obvious that the breaking of the emulsion in the saponification reaction mixture is practiced to improve the rate of operation to make the phase separation commercially feasible, and accordingly there can be substituted other wetting agents to prevent or resolve emulsification. Such agents are known within the ordinary skill of the art. Such wetting agents when employed are usually in the proportion of 10 to 40 weight percent of the saponification reaction mixture.

The conditions for saponification are not particularly critical; and the reaction can be carried out in conventional stirred, heated equipment at temperatures in the range of 30 to 100° C. for periods of 5 minutes up to 6 hours and longer. At the end of the saponification reaction, the saponification reaction mixture usually comprises 10% to 40% by weight fatty acid soaps, 1% to 5% unsaponifiables, 50% to 70% water, and 15% to 30% wetting agent.

Extraction

The saponification reaction mixture passes from the saponification reactor to a liquid/liquid extraction chamber which can be in the form of a single- or multi-stage mixing chamber where liquid/liquid extraction is carried out in countercurrent or co-current fashion. The extraction can be conducted in as many stages as is practical to achieve the desired result with or without extract and raffinate recycle. Illustrative of suitable types of liquid/liquid extraction equipment is the York-Schiebel type multi-stage mixing tower, a Podbielniak centrifugal extractor, a spray column or columns packed with Raschig rings or Berl saddles. Extraction processes and equipment of this type are disclosed in Section 11 of Chemical Engineer's Handbook edited by J. H. Perry, McGraw-Hill Book Company (1950), the disclosure of which is incorporated by reference.

The extraction solvents for removing the unsaponifiable materials from the saponification reaction mixture can be any organic solvent immiscible with or only partially immiscible with the saponification reaction mixture. Such solvents include water-immiscible, non-polar solvents, such as the various volatile hydrocarbons that are normally liquid at room temperature and pressure. These solvents can be aromatic hydrocarbons, such as toluene, xylene, benzene, methyl benzene and the like; aliphatic hydrocarbons, such as pentane, hexane, octane, 2-methyl hexane, 3-methyl pentane, 2,2-dimethyl butane and the like; naphthene hydrocarbons, such as cyclopentane, trimethyl cyclopropane, cycloheptane, methyl cyclohexane and the like; animal and vegetable fatty oils including linseed oils, cottonseed oils; mixtures of the hydrocarbon solvents having a distillation range rather than a definite boiling point, such as the paraffin oils or petroleum distillate fractions (e.g., naphtha, mineral spirits and kerosene); ethers, such as diethylether, methyl ethyl ether, diisopropyl ether, ethyl or methyl isopropyl mixed ethers and halogenated hydrocarbons, such as ethylene dichloride and the like.

In the extraction process, the solvent is added to the saponification reaction mixture in the ratio of about 0.1 to 20 parts by volume of solvent per part by volume of saponification reaction mixture. Usually for efficiency and economy in handling and solvent recovery of the resulting two-phase extraction mixture, the volume ratio is about 0.5 to about 5 parts by volume of solvent per part of saponification reaction mixture.

The solvent is contacted with the saponification reaction mixture in the extraction chamber, and the liquid/liquid extraction is carried out. Temperature is not particularly critical and it usually ranges from 30° C. up to the boiling point of the solvent/saponification reaction mixture in a batch or continuous, single- or multi-stage extraction technique for a time sufficient to allow a practical degree of phase equilibrium to be obtained. The resulting two-phase extraction mixture is then separated, such as by density differential (e.g., decantation, centrifugation or other gravity or gravity-assisted technique) into an aqueous raffinate phase and an organic extract phase. The raffinate phase typically comprises 10% to 30% higher fatty acid soap, 0% to 0.5% unsaponifiables and 20 to 80% water and wetting agent. The organic extract phase typically contains 1% to 10% unsaponifiable, 90% to 99% solvent and is processed for recovery.

Acidulation

The aqueous raffinate phase is then passed to an acidulation reaction chamber which is a stirred, heated reaction vessel equipped with a condenser. The acidulation reaction vessel is preferably equipped with a pH control cell which controls the flow of acid to the vessel in response to a pH measurement therein. The term "acid" is used herein according to conventional definitions and refers to a chemical compound which yields hydrogen ions when dissolved in water. The aqueous acid used for acidulation is conventionally sulfuric acid for economy and efficiency, although other mineral acids, such as hydrochloric or nitric or organic acids such as acetic or even acid gases such as $SO_3$ can be employed if desired.

The amount of acid employed is sufficient to completely neutralize the aqueous raffinate and reconstitute or "spring" higher fatty acid phase from the acidulation reaction mixture so that resulting acidulation mixture comprises an aqueous phase having a pH of about 2 to about 5 and an immiscible fatty acid phase. In a preferred practice, the pH of the aqueous phase of the acidulation reactor is monitored with a pH control cell which admits the aqueous acid to maintain the pH of the acidulation mixture at 2 to 5.

The acidulation reaction is usually carried out on a batch or continuous basis at temperatures within the range of 30° C. to 105° C. and usually about 90° C. to 105° C. for a time of about 5 minutes to 1 hour or more with moderate agitation. During the acidulation reaction, any dissolved or dispersed organic solvent carried over with the raffinate as well as any residual wetting agents are distilled over and are condensed.

After the acidulation is complete, a liquid free fatty acid phase separates from the aqueous phase in the acidulation reaction vessel and is removed by density differential separation techniques, such as by decantation. The aqueous phase can be processed for recovery.

Stripping

The free fatty acid phase is then vacuum stripped to separate the free fatty acid compounds from a high boiling residue fraction. This vacuum stripping technique is carried out in accordance with conventional distillation procedures wherein 95% is recovered as fatty acid distillate while leaving a 5% residual distilland at still temperatures ranging from 200 to 300° C. at a pressure of 1 to 10 mm. Hg. In a preferred embodiment, a small proportion, such as about 0.05 to 1 part per part by weight of fatty acid of a boron compound, such as crystals of $H_3BO_3$, is added prior to the fatty acid to distillation. This treatment with the boron compound further improves the color of the resulting distilled fatty acid.

To minimize process losses, part or all of the residual distilland from the distillates which contains in excess of 90% fatty acids with the balance being unsaponifiable can be recycled to the saponification step for recovery of the fatty acid values therefrom.

The yield of fatty acid distillate is in excess of 90% and usually in excess of 95% of the fatty acids present in the tall oil heads. The fatty acid distillate typically contains less than 0.5% and usually less than 0.2% by weight of unsaponifiable, has a Gardner-Delta Color of 4 to 5 and little or no "tall oil" odor.

Bleaching

The color of the products can be further improved by conventional treatment with bleaching clay or activated carbon before or after the stripping to improve the color and odor of the resulting distillate. For example, fatty acids have been bleached with natural absorbents, such as "fuller's earth" and "activated" absorbents such as activated carbon or the bentonite type clays. Fuller's earth is by far the most widely used of natural occurring unactivated clays. This mineral is chiefly a magnesium aluminum silicate present in attapulgite and montmorillonite. Fuller's earth usually has a pH in the range of 6.5 to 7.5.

Most raw clays and activated carbons show some ability to decolorize oils, and most of these can be improved to some extent by acid treatment. However, only a few types can be activated by acid treatment to produce efficient absorbents. The types usually used for activation are bentonites, consisting chiefly of montmorillonite clay minerals. Activated clays and the art of making them are old in the art. Activation is accomplished by treating a slurry of clay and water with a mineral acid, such as hydrochloric or sulfuric in an amount of about 35% of the total dry weight of clay. The mixture is then treated with steam to a temperature of about 200 to 210° F. for a period of about 5 to 6 hours and is therefor washed and filtered. The teachings of U.S. Pats. 1,397,113; 1,642,871; 1,776,990 and 1,796,990 relate to the acid activation of sub-bentonite type clay; and the example presented therein is illustrative of the method used for the preparation of the acid-activated clays applicable to the process herein described. Reference is also made to Kirk and Othmer, "Encyclopedia of Chemical Technology," volume 4, page 55 (1954), for a further description of acid-activated clays.

In decolorizing fatty acid by the contact process, the finely ground absorbent is intimately mixed with the oil to be processed; and the slurry is heated to the desired temperature until absorption is complete. The decolorized oil is separated from the clay by filtration, and the filter cake is washed and steamed to recover oil soakage. The used absorbent is discarded; recovery of contact grade clay seldom being practiced. Although acid-activated adsorbents are more expensive than natural clays, they exhibit much greater decolorizing power which makes their use economical. Examples of acid-activated clays that can be prepared according to the prior art referred to are the various grades commercially available trademarked products such as "Filtrol" and the Bennett-Clark clays. The "Filtrol" trademark identifies a group of acid-activated adsorbents and catalysts from the mineral montmorillonite $(MgCa)O \cdot Al_2O_3 \cdot 4SiO_2 \cdot nH_2O$. The acid-activated materials are supplied as fine white powders, 85 to 95% passing through a 200-mesh screen. The examples presented below illustrate the use of activated crystalline clay(s) or simply clay(s).

The present invention will be more clear from the following examples wherein all parts are parts by weight, and all percentages are weight percentages and all temperatures are in ° C. unless otherwise indicated.

EXAMPLE 1

A tall oil head cuts fraction having an Acid Number of 158, a Gardner-Delta Color of 10 and 23% unsaponifiable materials and 77% free fatty acids is charged to a heated, stirred saponification reactor in the proportion of 20 parts tall oil heads, 60 parts of water, 20 parts of isopropanol (99% pure) and 3.7 parts of sodium hydroxide. The saponification reactor is maintained at 80° C. for 2 hours with moderate mechanical stirring. At the end of this period, the agitation is stopped and the reaction mixture comprises an aqueous tall oil heads soap having a pH of about 12.

The tall oil heads soap is charged to an agitated extraction vessel where the soap is mixed with an equal weight of hexane solvent. The temperature in the solvent extraction vessel is 25 to 35° C. The extraction mixture is vigorously agitated for 30 minutes after which time the contents are allowed to settle into an aqueous raffinate phase and an organic extract phase. The organic extract phase is removed by decantation, and another equal weight of the fresh hexane solvent is charged to the extraction vessel. The procedure is repeated again so that there is a total of three "stages" of extraction.

The aqueous raffinate is then charged to the acidulation reactor where aqueous sulfuric acid is added and the mixture is stirred, and a free fatty acid phase formed during the acidulation. The pH of the aqueous phase of the acidulation reaction mixture is maintained at about 3. The free fatty acid phase is removed from the acidulation reactor by density differential and stripped at 1 mm. Hg and 220° C. to yield a free fatty acid distillate while leaving a high-boiling residue in the still.

The free fatty acid distillate is determined to have an Acid Number of 207, a Gardner-Delta Color of 8, an unsaponifiable content of 0.1 to 0.5% and the free fatty acids 99.5 to 99.9%. The free fatty acid distillate is analyzed by gas chromatography and determined to be 50% palmitic acid and 50% $C_{18}$ acids.

EXAMPLE 2

To further demonstrate the principles of the present invention, the following materials are charged into a reaction vessel equipped with a stirrer and heat source:

| | Parts |
|---|---|
| Tall oil heads cut (as in Example 1) | 1,000 |
| NaOH (50% solution in $H_2O$) | 228 |
| Isopropanol (99%) | 1,000 |
| Water | 1,772 |
| Total | 4,000 |

The reaction mixture is moderately agitated at 40° C. for 15 minutes to form a tall oil heads soap with a pH of 8.5. Four thousand parts of hexane are then added to the soap mixture, agitated for 15 minutes, then allowed to settle for 15 minutes into an aqueous raffinate phase and an organic extract phase. The hexane extract is decanted off and another 4,000 parts of hexane are added to the raffinate. This procedure is repeated for a total of four (4) hexane extractions.

The raffinate is then acidulated with aqueous sulfuric acid at a temperature of 100° C. for one-half hour to spring a free fatty acid phase which is separated from the acidulation mixture. The resultant fatty acid phase is vacuum stripped at 1 mm. Hg and 220° C. to yield a distillate having a Gardner-Delta Color of 6, while leaving about 1 to 2% by weight as distilland residue. This distillate is stirred at 80° C. for 30 minutes to 1 hour with 2.0% by weight of Filtrol brand bleaching clay, filtered and the procedure repeated 2 more times. The final fatty acid filtrate has a Gardner-Delta Color of 2, and this is again stripped at 1 mm. Hg and 220° C. to yield a distillate with a color of Gardner-Delta <1, an Acid Number of 208 to 210, an unsaponifiable content of 0.0%, a Rosin Acid content of 0.0%, and essentially no tall oil odor.

This fatty acid distillate is then dissolved in and crystallized from methanol solvent, and a 96 to 97% pure, water white palmitic acid having an Acid Number of 218 is recovered. There is no residual tall oil odor.

Similar results are obtained when benzene or toluene is used as the extraction solvent, or when potassium hydroxide is used as the saponification base.

EXAMPLE 3

Example 3 is conducted using the method of Example 2 except that the materials employed are as follows:

| | Parts |
|---|---|
| Tall oil heads cut (as in Example 1) | 1,000 |
| NaOH (50% solution in $H_2O$) | 251 |
| Isopropanol (99%) | 1,000 |
| Water | 1,479 |
| Total | 4,000 |

This soap has a pH of 12.0.

The following differences are noted:
(1) The color of this distillate yielded by the first stripping is Gardner-Delta 8 to 9.
(2) The color of filtrate after clay treatment is Gardner-Delta 4 to 5.
(3) The color of final fatty acid distillate is Gardner-Delta 3 to 4.

It is noted that Example 2 produced a fatty acid product two to three color grades lighter than Example 3. While the fatty acid product of Example 3 is suitable for many applications, the fatty acid product of Example 2 is preferred.

EXAMPLE 4

The procedure of Example 2 is repeated, except that crystals of $H_3BO_3$ is blended with the free fatty acid in the proportion of about 0.04% of $H_3BO_3$ by weight prior to the first vacuum stripping. The color of the distillate yielded by the first stripping is Gardner-Delta 4 as compared to 6 in Example 2. The use of the boric acid improves the color and decreases the need for subsequent bleaching operations when color is not desired in the final fatty acid product.

EXAMPLE 5

This example illustrates typical material balance values for a refining plant operating in accordance with the process described above with reference to the drawing, based on 100 pounds of tall oil heads.

To the saponification reactor are charged 100 pounds of tall oil heads (comprising 80% free fatty acids and 20% unsaponifiables), 100 pounds of 99% isopropanol, 12.5 pounds of 98% NaOH and 200 pounds of water.

After saponification, this mixture flows to the extractor where it is extracted with 400 pounds of hexane. The hexane extract containing substantially all of the unsaponifiables are processed for recovery. The aqueous raffinate flows to the acidulation reactor where it is neutralized with 13.5 pounds of 98% $H_2SO_4$ to spring the free fatty acid phase.

The aqueous phase from the acidulation reactor is processed for recovery and the free fatty acid phase (comprising about 80 to 85 pounds of fatty acid) is blended with $H_3BO_3$ in the proportion of 0.05% to 0.1% by weight of the free fatty acid. This mixture is stripped at 220° C. and 1 mm. Hg pressure to 75 to 78 pounds of free fatty acid distillate having a Gardner-Delta Color of 4 to 5, a free fatty acid content of 99.8% and unsaponifiable content of 0.2%. The distilland residue from the stripping comprises about 4 pounds (mostly fatty acids) and is recycled to the saponification reactor for recovery.

The free fatty acid distillate can be further treated with clay and additional distillations if higher purity and lower color are desired.

Having thus described the invention, what is claimed is:

1. The process for recovering $C_{12}$ to $C_{22}$ higher aliphatic fatty acids and mixtures thereof from crude tall oil comprising the steps of:
   fractionally distilling the crude tall oil to produce a tall oil head distillation fraction containing the higher fatty acids and unsaponifiable materials;
   adding to said tall oil head distillation fraction under saponification conditions a water-soluble alkaline base reactive with the fatty acids to form a saponification reaction mixture in which saponification of the fatty acids occurs, the amount of said base being equal to or slightly greater than the stoichiometric proportion required to substantially fully saponify the tall oil head fraction;
   extracting unsaponified material from said aqueous saponification reaction mixture with a water-immiscible organic solvent having an affinity for said unsaponified material to yield an organic extract phase and an aqueous raffinate phase;
   separating said raffinate phase from said extract phase, the raffinate phase containing less than about 0.5% unsaponifiable materials;
   acidulating said aqueous raffinate phase with an aqueous acid the amount of acid being sufficient to substantially completely neutralize said fatty acid soap and form a fatty acid phase;
   separating the resulting fatty acid phase from the aqueous phase; and
   stripping said fatty acid phase to yield a fatty acid distillate and a distilland residue.

2. The process of claim 1 wherein the water-soluble alkaline base is added in an amount sufficient to establish and maintain the pH of said saponification reaction mixture between about 7 and about 8.5.

3. The process of claim 1 wherein boric acid is added to said fatty acid phase in the proportion of 0.01 to 1 part per 100 parts of fatty acid phase prior to said stripping step.

4. The process of claim 1 wherein said fatty acid distillate is treated with activated carbon or clay to further remove color and odor therefrom.

5. The process of claim 1 wherein distilland residue is recycled to said saponifying step.

6. The process of claim 1 wherein said water-soluble alkaline base is a solution of an alkali metal hydroxide.

7. The process of claim 2 wherein said fatty acid distillate contains less than about 0.5% of unsaponifiable materials.

8. The process of claim 1 wherein said fatty acid distillate comprises palmitic acid.

9. The process of claim 8 wherein said palmitic acid contains less than about 0.5% by weight of unsaponifiable materials.

10. The process of claim 8 wherein said palmitic acid has a Gardner-Delta Color of less than 9.

11. The process of claim 1 wherein said reaction mixture includes a wetting agent in an amount sufficient to reduce emulsification.

12. The process of claim 11 wherein said wetting agent is a lower molecular weight alcohol.

References Cited

UNITED STATES PATENTS

| 2,227,203 | 12/1940 | Scott | 260—412.5 |
| 3,575,952 | 4/1971 | Morris et al. | 260—97.6 |
| 3,496,071 | 2/1970 | Spence | 260—97.6 |
| 3,551,404 | 12/1970 | Watkins | 260—97.6 |
| 3,066,160 | 11/1962 | Hampton | 260—97.6 |

MELVYN I. MARQUIS, Primary Examiner

U.S. Cl. X.R.

260—97.5, 97.6, 412.5, 418